United States Patent
García Luna (10) Patent No.: US 7,867,333 B2
(45) Date of Patent: Jan. 11, 2011

(54) MORTAR COMPOSITIONS WITH BASE ON ULTRA-FINE CLINKER, REFINED SAND AND CHEMICAL ADDITIVES

(75) Inventor: Armando García Luna, Monterrey (MX)

(73) Assignee: GCC Technology and Processes S.A., Lausanne (CH)

( * ) Notice: Subject to any disclaimer, the term of this patent is extended or adjusted under 35 U.S.C. 154(b) by 901 days.

(21) Appl. No.: 11/574,836

(22) PCT Filed: Jun. 2, 2005

(86) PCT No.: PCT/IB2005/001807

§ 371 (c)(1),
(2), (4) Date: May 24, 2007

(87) PCT Pub. No.: WO2006/027645

PCT Pub. Date: Mar. 16, 2006

(65) Prior Publication Data

US 2007/0256604 A1    Nov. 8, 2007

(30) Foreign Application Priority Data

Sep. 9, 2004    (MX)    .................. PA/A/2004/008735

(51) Int. Cl.
C04B 7/02    (2006.01)
C04B 14/06    (2006.01)

(52) U.S. Cl. ...................... 106/713; 106/724; 106/728; 106/737

(58) Field of Classification Search ................. 106/713, 106/724, 728, 737
See application file for complete search history.

(56) References Cited

U.S. PATENT DOCUMENTS

| | | | |
|---|---|---|---|
| 3,591,542 A | | 7/1971 | Bonnel et al. |
| 4,038,094 A | * | 7/1977 | Bondi ........................ 106/711 |
| 5,736,600 A | | 4/1998 | Karkare et al. |
| 5,873,936 A | | 2/1999 | Ogden |
| 2002/0005149 A1 | | 1/2002 | Karkare et al. |

(Continued)

FOREIGN PATENT DOCUMENTS

EP    0696558 A2    2/1996

(Continued)

OTHER PUBLICATIONS

EP 2075240 (Jul. 1, 2009) Kurz et al. abstract only.*

(Continued)

*Primary Examiner*—Paul Marcantoni
(74) *Attorney, Agent, or Firm*—Rothwell, Figg, Ernst & Manbeck, P.C.

(57) ABSTRACT

The invention describes improved mortar compositions that can reach compressive strength values up to six times more than the obtained ones by conventional mortars at the first hours of setting, as well as up to three times more at 28 days of setting. Cementitious materials, such as Portland cement and clinker of Portland cement were refined in a high energy mill until reaching the greater fineness possible (100%<10, um) to obtain a material with greater mechanical resistance by compression that those that are reached with normal cement. The compositions of the invention containing the refined cementitious material as well as refined and suitably distributed sand, develop compressive strengths substantially higher (greater to 100 MPa).

40 Claims, 6 Drawing Sheets

U.S. PATENT DOCUMENTS

2004/0211342 A1* 10/2004 Sprouts et al. .............. 106/823
2008/0156225 A1* 7/2008 Bury ....................... 106/14.05

FOREIGN PATENT DOCUMENTS

| EP | 1439154 A1 | 7/2004 |
| GB | 368498 | 3/1932 |
| GB | 575439 | 2/1946 |
| WO | WO 2005/105702 A1 * | 11/2005 |

OTHER PUBLICATIONS

DE 19854476 A1 (May 31, 2000) Mitkova abstract only.*
JP 08059322 A (Hamada et al.) Mar. 5, 1996. abstract only.*
JP 07144953 (Okamura et al.) Jun. 6, 1995. abstract only.*
JP 03023247 A (Teramura et al.) Jan. 31, 1991 abstract only.*
JP 63162555 (Ueda et al.) Jul. 6, 1988 abstract only.*

"Effect of polycarboxylate superplasticizer on contribution of interfacial transition zone to electrical conductivity of portland cement mortars", Xu et al. ACI Materials Journal (2000), 97(4), p. 418-424.*
Garza-Gutierrez et al., "Optimizing milling parameters for refining portland cement," Journal of Metastable and Nanocrystalline Materials, 2003, vol. 15-16, pp. 395-400.
Sarkar et al. "Important properties of an ultrafine cement—Part I," Cement and Concrete Research, 2001, vol. 31, pp. 119-123.
Sarkar et al. "Microstructural development in an ultrafine cement—Part II," Cement and Concrete Research, 2001, vol. 31, pp. 125-128.
Master Builders, Inc., "Rheobuild 300FC, High-range water reducing admixture" 1998, 2 pages.
Master Builders, Inc., "Glenium 300NS, Full-range water reducing admixture" 2006, 2 pages.

* cited by examiner

FIGURE 6

MORTAR COMPOSITIONS WITH BASE ON ULTRA-FINE CLINKER, REFINED SAND AND CHEMICAL ADDITIVES

CROSS REFERENCE TO RELATED APPLICATION

This application is a 35 U.S.C. §371 National Phase Entry Application from PCT/IB2005/001807, filed Jun. 2, 2005, and designating the United States.

FIELD OF THE INVENTION

The present invention is related to the field of construction, specifically to the development of improved mortar compositions that exhibit greater compressive strength.

BACKGROUND OF THE INVENTION

Portland cement (PC) is the cementitious material widely used in the world. A very important part of the wealth of a country is mainly in the infrastructure on which it counts, as they would be constructions, highways, and bridges, among others, all these produced with concrete with PC. In the last years, there has been emphasis in the importance of doing more lasting and more resistant constructions facilitating with it the life of the human being, so that the infrastructure can be maintained in better conditions and by more time. In order to obtain the previous, high performance cements (HPC) have been used[1].

From the environmental point of view its also justified the use of cements that produce concrete with more durability by their repercussion in the emission to the atmosphere of smaller amounts of carbon dioxide ($CO_2$), an important reduction in consumption of electrical energy, as well as reduction of the problems caused by an inadequate disposition of the damaged material that is replaced by new.

It has been spoken much of the associated disadvantages of a greater fineness of the cement like a retrogression in compressive strengths, high rates of generated heat, and the substantial increase in the water demand, among others[2,3], same that would not actually allow to wait for high values in the compressive strength.

Previous works conducted in slightly refined cement have revealed that its compressive strength can be increased by means of a refinement of particles in the rank of few microns or sub-micrometric[3]. On the other hand, looking for a type of cement that could be injected in the cracks originated after a damage to concrete structures, or looking for that type of cement which it could be molded in specific geometries, it was discover that the refinement of the cement causes a number of disadvantages, such as:

a) A retrogression in its resistance,
b) Unusual faster setting times, and
c) A great demand of water by the refined cement, which dramatically reduces its compressive strength[2,3].

On the other hand, although it has been observed that the use of superfine clinker in combination with superfine sand and additives for the mortar production can reach values of compressive strength from 18.9 to 20.8 $N/mm^2$, which surpass the values obtained for conventional mortars[4] as well as the disadvantages in the refined cement use (low compressive strength), these compositions do not offer an ample range of applications.

Because in the industry of construction the cement and mainly mortar (cement, sand and water) is a union material of multiple elements (blocks, bricks, etc.) or structures of civil engineering, is important that these materials provide durable unions, complete and of adequate resistance that influence in a greater quality and resistance of the constructive elements.

In this one sense and added to the fact that the compositions of cement or mortar generate viscous watery mixtures that sometimes are difficult to handle, multiple improvements have been generated on the matter.

To date multiple developments for the improvement of mortar have been used, as much in their compressive strength as in their characteristics, using additives that cause repellence to water such as fatty acids, polymeric or organic remainders[5,6,7,8] and including the air addition in their structure to reduce to their weight[9].

On the other hand cementitious mixtures are known with a particle size distribution minor to 7 μm at 50% and minor to 24 μm at 95%, containing superfine Portland cement clinker, superfineness sand of 5% to 95% in weight with respect to superfine clinker, modifiers (activators of surface, expansive components, fluidizers, delayers, accelerators and water retention agents) and additives such as bentonite, silica and naphthalene sulphonate formaldehyde condensate[4]. Also are known cement compositions for floor coverings that contain fineness sand as aggregate with more advantageous characteristics of fluidity and develop compressive strengths of the order from 34 MPa to 48 MPa[10].

Nevertheless, the previous developments include multiple elements and compressive strength limited to a few applications, which the production cost increases and it is necessary to apply a greater amount of energy and work in its obtaining.

By the previous, it is important to continue developing improved mortar compositions that allow the generation of more resistant concretes with versatile uses repelling in the generation of better characteristics of the cementitious materials.

OBJECTIVES OF THE INVENTION

It's one of the objectives of the invention to provide improved mortar compositions that exhibit greater compressive strengths than the obtained by conventional mortars.

It's another of the objectives of the invention to provide improved mortar compositions that include ultra-fine clinker and refined sand with a particle size smaller to 10 μm to a particle size distribution of 100%.

It's another one of the objectives of the invention to provide improved mortar compositions with greater compressive strengths from 2 to 6 times in its magnitude, than the obtained by conventional mortars in the first hours of setting, as well as up to three times more in its magnitude at 28 days of setting.

It's another one of the objectives of the invention to provide improved mortar compositions with compressive strengths from 10 MPa to 57 MPa at 1 day of setting and from 46 MPa to 108 MPa at 28 days of setting.

DETAILED DESCRIPTION OF THE INVENTION

In spite of the existing improvements until day in mortar compositions, before the present invention improved mortar compositions did not exist with greater compressive strengths values superior to 100 MPa at 28 days of setting.

The mortar compositions of the present invention exhibit greater compressive strengths than the observed ones with mortars made solely with PC. Also they use different mixtures of PC and refined clinker, process at levels of a ultra-fine Portland cement (UPC), generating with it a very significant improvement in the compressive strength properties and being in new particle size distributions and increase in the specific superficial area.

On the other hand, the compositions of the invention also include PC as well as standard sand, elements commonly used in the mortar obtaining for construction and additionally a reducing water additive.

In one of the embodiments of the invention, the mortar compositions comprise:
a) A cementitious material, selected of the group that consist of PC, ultra-fine PC, ultra-fine clinker or combinations of such,
b) Sand, selected of the group that consists of standard sand, milled sand or combinations of the same ones, and
c) A reducing water additive, selected of the group consisting of the polycarboxylate type additive, sold under the trademark Rheobuild 3000 by MBT Holding AGE (hereinafter referred as Rheobuild 3000), the polycarbixylate type additive solde under the trademark Glenium-106, by BASF Admixtures, Inc. (hereinafter referred as Glenium-106) or combinations of such, wherein the cementitious material and the sand are in a proportion 1:1 in weight with respect to the total weight of the composition and the additive is additionally in a percentage in weight from 1 to 2.5 with respect to the weight of the cementitious material in the composition.

In one of the preferred embodiments of the invention, the compositions comprise:
a) Like cementitious material, a combination of:
Ultra-fine clinker in a proportion in weight with respect to the total weight of the cementitious material from 0 to 70%, and
PC in a proportion in weight with respect to the total weight of the cementitious material from 30 to 100%
b) Like sand, a combination of:
Standard sand in a proportion in weight with respect to the total weight of sand from 60 to 100%, and
Milled sand in a proportion in weight with respect to the total weight of sand from 0 to 40%
c) Like reducing water additive, Rheobuild 3000 in a proportion in weight with respect to the total weight of the cementitious material in the composition from 1 to 2.5%.

Although are still more preferred those compositions that comprise:
a) Like cementitious material, a combination of:
Ultra-fine clinker in a proportion in weight with respect to the total weight of the cementitious material of 30%, and
PC in a proportion in weight with respect to the total weight of the cementitious material of 70%
b) Like sand, a combination of:
Standard sand in a proportion in weight with respect to the total weight of sand from 60 to 90%, and
Milled sand in a proportion in weight with respect to the total weight of sand from 10 to 40%
c) Like reducing water additive, Rheobuild 3000 in a proportion in weight with respect to the total weight of the cementitious material in the composition of the 2.25%.

For all the compositions of the invention, the ultra-fine PC or the ultra-fine clinker has a particle size smaller to 10 μm to a particle size distribution of the 100%, preferably of 9.8 μm. This cementitious material can be obtained by means of the milling of PC or clinker nodules in high energy mills, for example by the methodology described by De la Garza-Gutierrez and collaborators[11], although similar methods of milling that obtain the indicated particle size can be used. Also the milled sand has a particle size smaller to 10 μm to a particle size distribution of 95%, and is obtained in the same way that the ultra-fine cementitious material, by means of standard sand milling in mills of high energy.

For the used standard sand, this one corresponds to the type of silica sand credited by ASTM for the mortar manufacture (2.75 times the weight of cement) in its original state as it is commercially obtained, although any type of sand that fulfills the standards can be used. Nevertheless for the case of the milled sand, those are preferred that can reach the particle size previously indicated after their milling.

On the other hand, the PC that can be used for the obtaining of the compositions of the invention, includes ordinary Portland cement (OPC), cement type I, type II, type IV, type V and mixtures of such. Also, commercial presentations of PC that contain variable percentage of filler agents (permissible approx 10% by the norms), are included here. Nevertheless other cements can be used with which the mortar compositions of the invention can be obtained.

The pastes obtained by the mixed of the compositions of the invention with water, are characterized by their reduced water content and for their easy handling, independently to be conformed by elements with very small particle sizes. Although actually the use of this one type of materials is not very recommendable for the obtaining of mortars or high resistance concretes due to their great water absorption capacity, the compositions of the invention surpass these difficulties and of surprising way they can reach very superior values of compressive strength than the observed ones for similar materials. The compressive strength developed by the compositions of the invention is comparable with the compressive strength of high alumina cement, without the disadvantages to include alumina in high concentrations and the high costs that imply their production.

The superior compressive strength compositions of the invention, allow to manipulate and to control the setting time required (from 3 minutes to 3 hours), which allows a great versatility in their applications.

With the mixture of the elements that conform the mortar compositions of the invention, are obtained formulations with:

A smaller demand of water (w/c of 0.40),
High compressive strengths at early stages (1 and 3 days) and an important increase in the final compressive strength reached (28 days), when using refined PC or clinker of refined PC.
Improvements in the mortar fluidity, allowing to diminish the amount of water applied when replacing part of the standard sand by milled sand, and
High compressive strengths from early stages (1 day) at 28 days, due to the milled sand use in certain proportions.

The compositions of the invention can be set up in mortars of early high resistance, mortars or grouts to seal fissures, high resistance concretes, raincoat concretes, or in applications that require constructive materials with high compressive strengths.

Also, in comparison with known similar compositions to date, the compositions of the invention represent advantages such as the not-inclusion of other materials that they can increase the price or complicate the mixed process, such as bauxite, high alumina kaolins, mineralized additives and harmful additives to the health, etc.

Like a way to illustrate the present invention, the following examples appear, so they don't restrict the scope of the invention.

Example 1

Milling of Materials

A commercial GmbH-Zoz Simoloyer CM01 milling device operated by computer was used to refine the materials of the invention.

High energy milling operations were dry-conducted in air atmosphere, whereas the temperature of vial container was kept at room temperature using a cooling system with recycled water placed by outside the container. Some drops of propylene glycol were added to avoid powder stacking in the milling camera. A stainless steel milling container with capacity of 2 liters was used, covered in its interior with an inner coating of $Si_3N_4$ to avoid erosion of container and therefore later contamination. The use of the Simoloyer device is limited to a maximum of operation of 900 rpm and 100° C., like safety measure in its operation; 2.3 Kg of stabilized $ZrO_2$ balls (YTZ, 5 mm diameter) were used as grinding media in milling operations. A commercial particle size distribution (PSD) apparatus Mastersize 2000—Marvern Inst. was used as well a commercial equipment of X ray diffraction (DRX), Siemens D-5000 to follow crystallographic changes.

Example 2

Obtaining of Ultra-Fine Cementitious Material

Clinker obtained by conventional processes and with a particle size distribution as its illustrate in table 1 (clinker), was ground according to example 1, during 60 minutes, with a relation balls/powder (B/P) of 40 (40 g of balls by 1 g of powder), at a rotational speed of mill shaft-impelling arms of 500 rpm and with the addition of 6 drops of propylene glycol[11].

The particle size distribution obtained after the milling procedure is show in table 1 (ultra-fine clinker). These powders were mixed with dehydrated natural gypsum powder (see table 1, gypsum) to form a refined Portland cement, identified like MK.

Table 1 shows the particle size distribution (PSD in μm) of the elements of the compositions of the invention. Portland cement is distinguished (PC).

TABLE 1

| Material | PSD (μm) | | | | | | | | |
|---|---|---|---|---|---|---|---|---|---|
| | 1% | 10% | 20% | 25% | 50% | 75% | 80% | 90% | 100% |
| PC | 0.6 | 2.1 | 3.97 | 5.5 | 12 | 23 | 26.6 | 36.4 | 63 |
| Clinker | 0.6 | 2.15 | 4.55 | 6.12 | 14.8 | 33 | 40.5 | 66.1 | 190 |
| Ultra-fine clinker | 0.45 | 0.67 | 0.98 | 1.12 | 2.38 | 4.1 | 4.98 | 6.87 | 9.8 |
| Gypsum | 2 | 13.1 | 39.9 | 60 | 355 | 610 | 708 | 967 | 1800 |
| Sand-Spex | 0.45 | 1.63 | 2.33 | 4.5 | 15 | 35 | 45.6 | 73.9 | 185 |

Example 3

Milled Sand Obtaining

Figure 1:
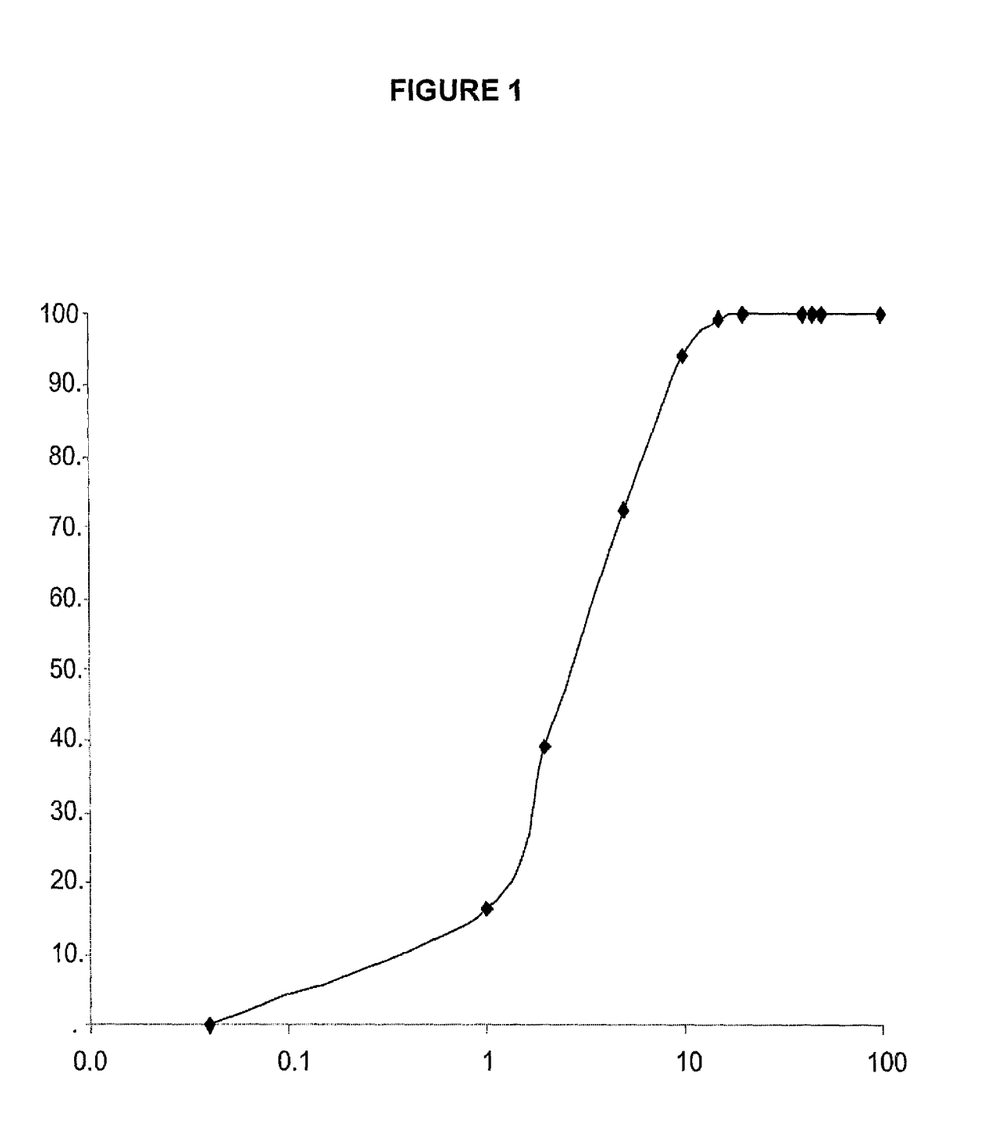
FIG. 1. Shows a graph of the particle size distribution (PSD in μm) of the milled sand used in the compositions of the invention according to the values shown in Table 2. The sand was graduated according to ASTM C778. Abscissas represents the particle size (μm) and ordinates the percentage (%).

Standard sand type silica sand credited by ASTM for the mortar manufacture, was ground in a Spex mill during 60 minutes, with a relation balls/powder (B/P) of 4 (4 g of balls by 1 g of powder), at a rotation speed of the mill shaft-impelling arms of 500 rpm and with the addition of 3 drops of propylene glycol, obtaining the particle size distribution show in FIG. 1 (Arena-Spex). Later the sand thus obtained, was put under a process of milling in a high energy Simoloyer mill according in example 1, during 30 minutes, with a relation balls/powder (B/P) of 20 (20 g of balls by 1 g of powder), at a rotation speed of the mill shaft-impelling arms of 500 rpm and with the addition of 21 drops of propylene glycol[11], obtaining the particle size distribution show in table 2 and FIG. 1.

The resulting sand of this one last process was used for the obtaining of the compositions of the invention.

TABLE 2

| | PSD (μm) | | | | | |
|---|---|---|---|---|---|---|
| Material | 0.13% | 16.3% | 39% | 73% | 95% | 99.5% | 100% |
| Milled sand | 0.04 | 1 | 2 | 5 | 10 | 15 | 20 |

Example 4

Portland Cement Obtaining

Portland cement containing limestone was obtained in Cements of Chihuahua plant by means of conventional methods. The cement chemical composition was the following: CaO (64.2%), $SiO_2$ (21.8%), $Al_2O_3$ (4.1%), $Fe_2O_3$ (3.3%), MgO (1.4%), $K_2O$ (0.61%), $SO_3$ (2.5%), $Na_2O$ (0.15%), and other traces. The cement particle size distribution can be observed in table 1 (PC).

Example 5

Obtaining of Mortar Mixtures of the Invention

Mortar mixtures were prepared with the elements described previously by means of conventional mixes with mixers. Later test tubes were prepared in mortars of 5×5×5 cm according to ASTM C-109 to determine the compressive strength of each one of them.

Example 6

Mixtures of PC, Standard Sand and Reducing Water Additive

The mortar mixtures were obtained agreed to example 5, using Rheobuild-3000 like reducing water agent. Table 3 and FIG. 2 show the compressive strengths reached in mixtures of PC, standard sand and 0, 1 and 2.25% of reducing water agent, based on cement weight, in comparison with control mixture (without additive).

As it can be observed in table 3, the addition of 1% of reducing water agent does not have important effect in the compressive strength observed at the first day, but in the following evaluations a change can be observed generating greater compressive strength than the PC without additive, for example 494 Kg/cm² at 28 days (approx. 500 Kg/cm²). This value represents 160 Kg/cm² more than without additive.

In the case of the sample with 2.25% of reducing water agent, practically there is no gain of compressive strength at 1 day, not even the compressive strength that offers the normal PC without additive. For the day 3 their values of compressive strength are increased substantially so that it surpasses the value observed for PC; at the day 28 registers a compressive strength of 459 Kg/cm², superior value than the PC value, but smaller than the values reached with 1.0% of reducing water agent.

Figure 2:
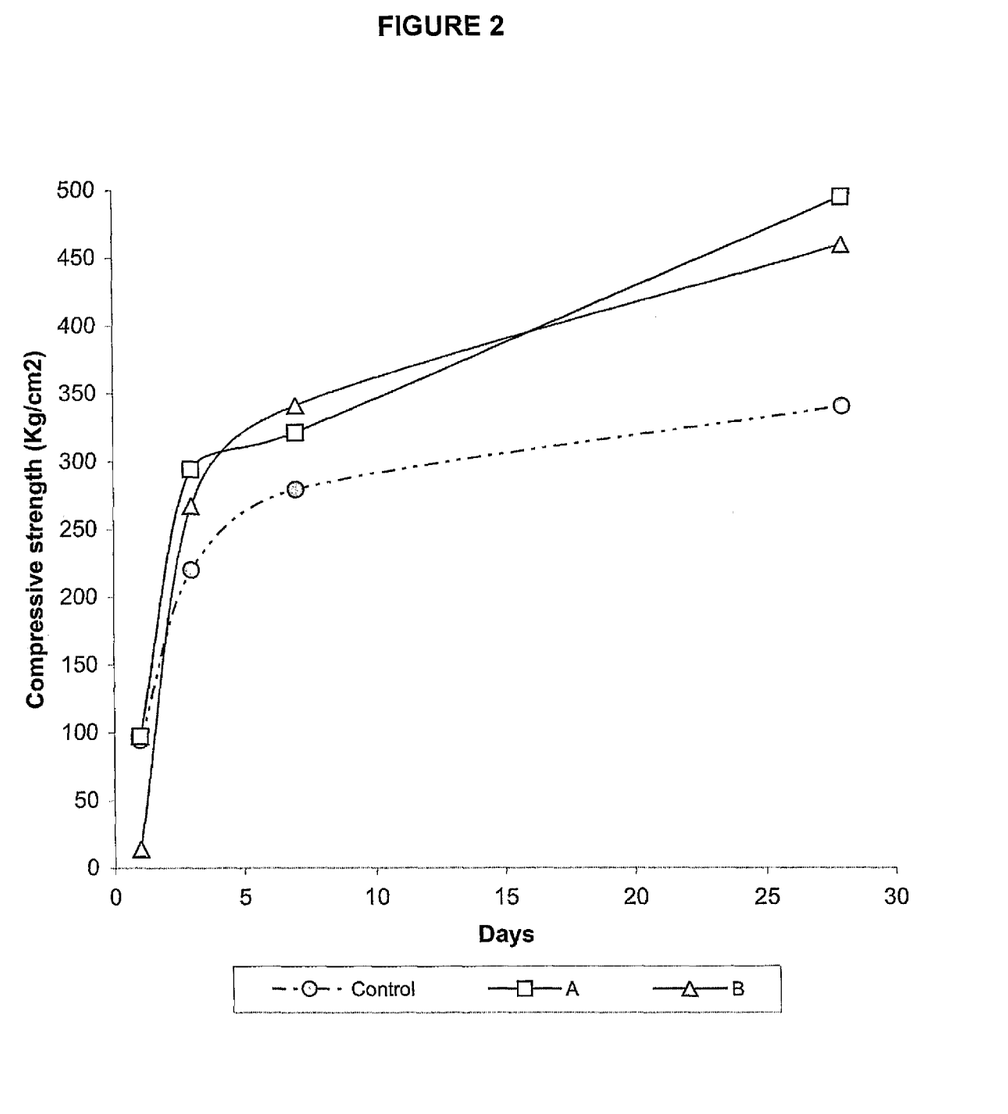
FIG. 2. Shows a graph of the values shown in the Table 3, that shows the compressive strength ($Kg/cm^2$) of test tubes of PC and standard sand in relation to the addition of variable percentages of reducing water agent.

As it can be observed, the addition of the reducing water additive increases the compressive strength values at 28 days near 500 Kg/cm², in comparison with the value that is obtained with a normal PC without additive (FIG. 2).

Example 7

Mixtures of MK, PC, Standard Sand and Reducing Water Additive

Figure 3:
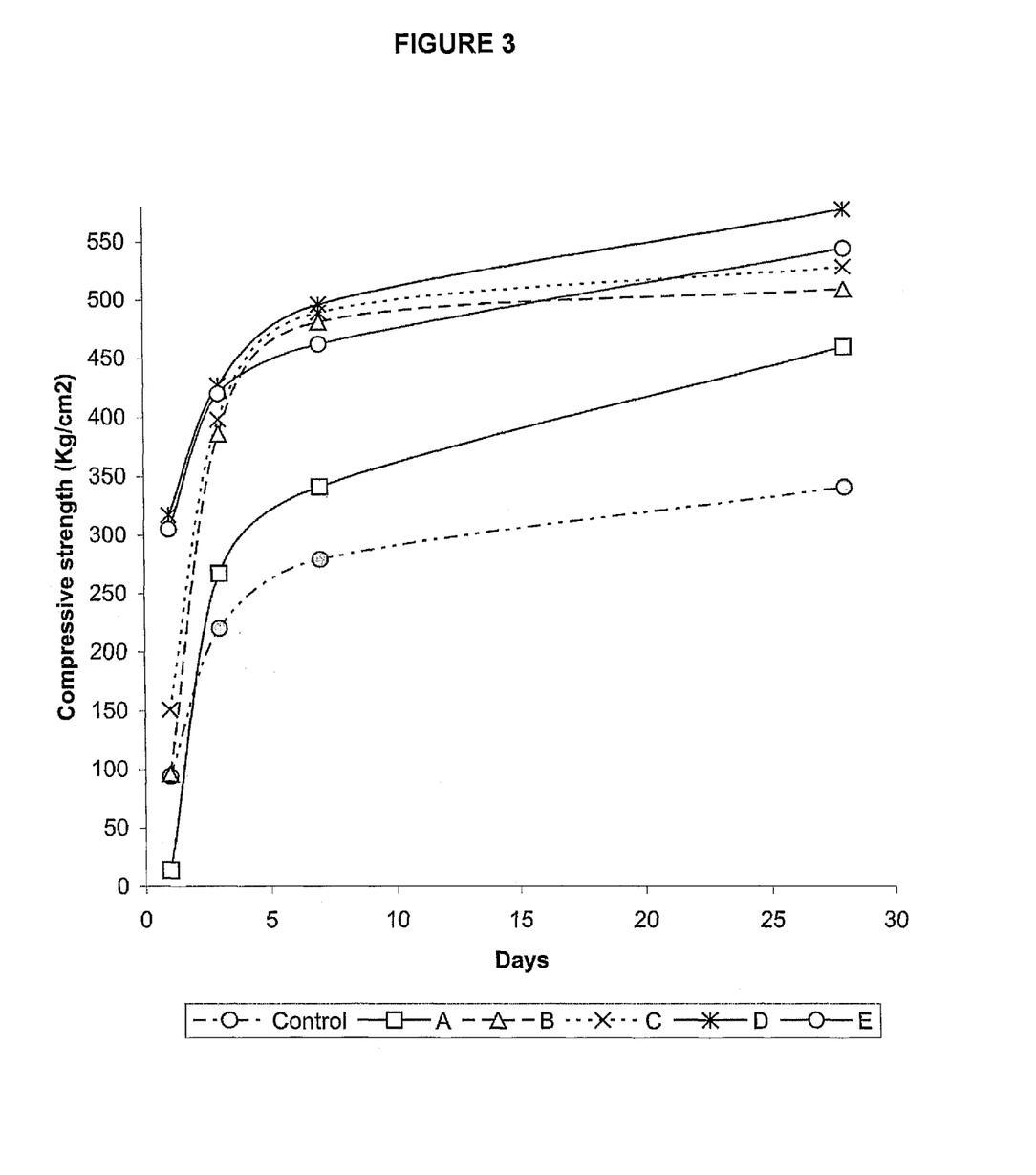
FIG. 3. Shows a graph of the values shown in the Table 4, that shows the compressive strength ($Kg/cm^2$) of test tubes elaborated with standard sand and variable percentages of mixtures of ultra-fine clinker and PC.

The mortar mixtures were obtained agreed to example 5, being used Rheobuild-3000 like reducing water agent. Table 4 and FIG. 3 show the compressive strengths reached in mixtures of different proportions of MK and PC, standard sand and with 2.25% of reducing water, based on the cement weight, in comparison with a control mixture (without additive).

Table 4 show the compressive strength results of test tubes elaborated with mixtures of milled clinker, MK and PC.

TABLE 3

| | % Cementitious | | % Sand | | %* Additive | Days of cured (Kg/cm²) | | | |
|---|---|---|---|---|---|---|---|---|---|
| Series | MK | PC | Milled sand | Standard sand | | 1 | 3 | 7 | 28 |
| Control | 0 | 100 | 0 | 100 | 0 | 94 | 220 | 279 | 340 |
| A | 0 | 100 | 0 | 100 | 1 | 97 | 294 | 321 | 494 |
| B | 0 | 100 | 0 | 100 | 2.25 | 14 | 267 | 341 | 459 |

*Percentage with respect to the total weight of the cementitious.

TABLE 4

| Series | % Cementitious MK | % Cementitious PC | % Sand Milled sand | % Sand Standard sand | %* Additive | Days of cured (Kg/cm²) 1 | 3 | 7 | 28 |
|---|---|---|---|---|---|---|---|---|---|
| Control | 0 | 100 | 0 | 100 | 0 | 94 | 220 | 279 | 340 |
| A | 0 | 100 | 0 | 100 | 2.25 | 14 | 267 | 341 | 459 |
| B | 10 | 90 | 0 | 100 | 2.25 | 96 | 386 | 481 | 508 |
| C | 20 | 80 | 0 | 100 | 2.25 | 151 | 398 | 489 | 527 |
| D | 30 | 70 | 0 | 100 | 2.25 | 317 | 427 | 496 | 576 |
| E | 40 | 60 | 0 | 100 | 2.25 | 305 | 420 | 462 | 543 |

*Percentage with respect to the total weight of the cementitious.

As it can be observed in table 4, the mixture of milled clinker MK and PC correspond to the test tubes elaborated mixing 10, 20, 30 and 40% of MK with the corresponding amount of PC, according to the case, to complete the 100% of cementitious, being remained fixed the percentage of standard sand (100%) and additive (2.25%).

For the mixture with 10% of MK, the compressive strength results obtained at one day (96 Kg/cm²) and at 28 days (508 Kg/cm²) they are similar to the shown ones in FIG. 2 for a test tube of 100% of PC with 1% of reducing water additive. Nevertheless for test tubes with intermediate dates is observed an important difference, since at 3 days as to 7 days, the compressive strength development is greater with 10% of MK than with 0% of MK; at 3 days 386 Kg/cm² are reached against 267 Kg/cm² and at 7 days 481 Kg/cm² are reached against 341 Kg/cm².

The obtained data show that the addition of MK to the mortar composition causes the development of higher compressive strengths at early stages, in comparison with the control.

The mentioned above can be corroborated when observing the results at the first day of setting for the samples with 20 and 30% of MK, since in the first case reaches a value of 151 Kg/cm² and for the second a value of 317 Kg/cm². This means that a mortar with 30% of MK allows reach at the first day the compressive strength that develops a normal PC without additives at 28 days. In addition this mixture allows surpass the final compressive strengths of the PC alone and the PC with reducing water additive.

Example 8

Figure 4:
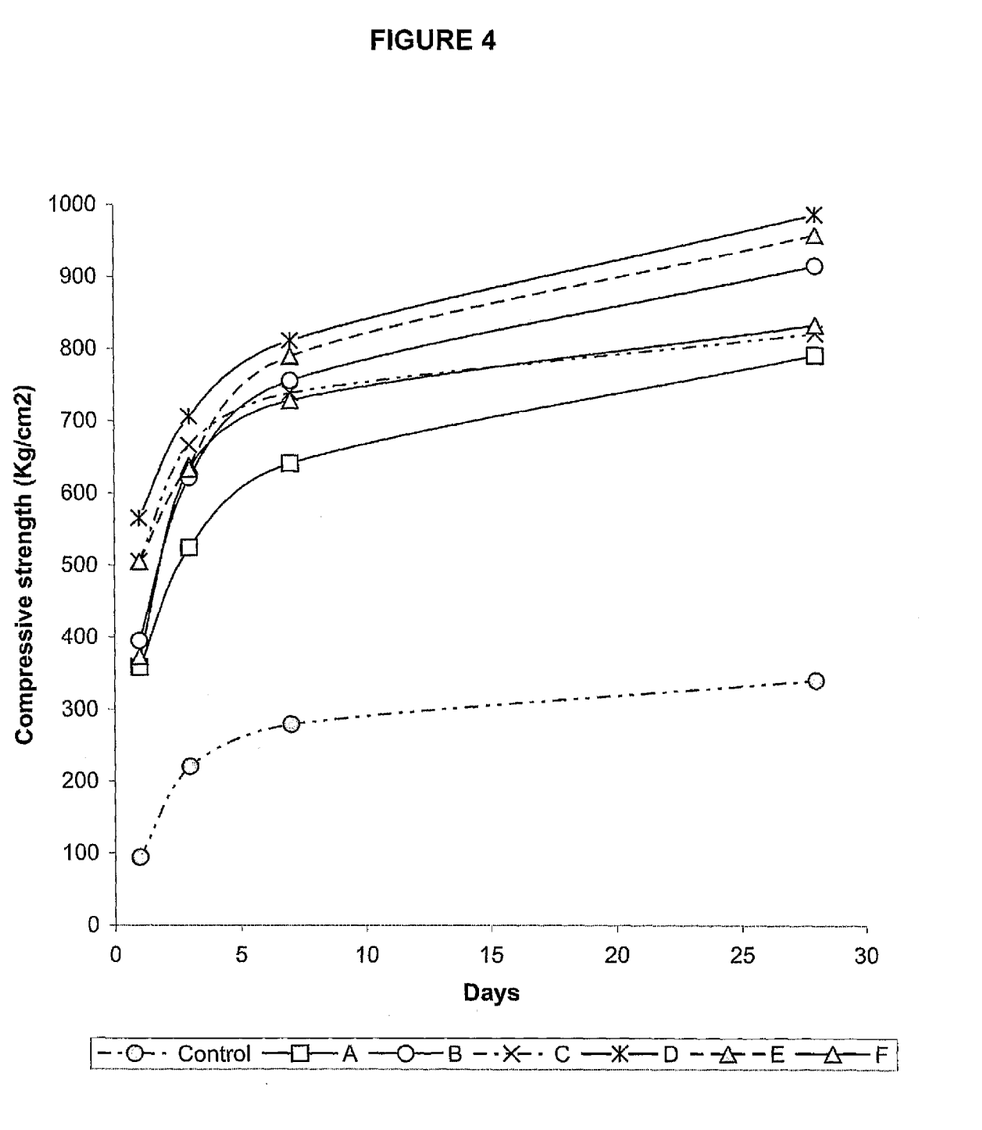
FIG. 4. Shows a graph of the values shown in the Table 5, that shows the compressive strength ($Kg/cm^2$) of test tubes elaborated with mixtures of 30% of ultra-fine clinker, 70% of PC, 20% of milled sand, 80% of standard sand and variable percentage of additive. Series F shows the resistance reached with Glenium-106.

Mixtures of MK, PC, Milled Sand, Standard Sand and Variable Amounts of Reducing Water Additive The mortar mixtures were obtained agreed to example 5, being used Rheobuild-3000 and Glenium-160 like reducing water agents. Table 5 and FIG. 4 show the compressive strengths reached in mixtures of fixed proportions of MK, PC, milled sand and standard sand, and with 1, 1.5, 2, 2.25 and 2.5% of reducing water additive, based on the cement weight, in comparison with a control mixture (without additive).

TABLE 5

| Series | % Cementitious MK | % Cementitious PC | % Sand Milled sand | % Sand Standard sand | %* Additive | Days of cured (Kg/cm²) 1 | 3 | 7 | 28 |
|---|---|---|---|---|---|---|---|---|---|
| Control | 0 | 100 | 0 | 100 | 0 | 94 | 220 | 279 | 340 |
| A | 30 | 70 | 20 | 80 | 1 | 358 | 524 | 641 | 790 |
| B | 30 | 70 | 20 | 80 | 1.5 | 395 | 621 | 755 | 914 |
| C | 30 | 70 | 20 | 80 | 2 | 505 | 666 | 738 | 820 |
| D | 30 | 70 | 20 | 80 | 2.25 | 565 | 706 | 811 | 985 |
| E | 30 | 70 | 20 | 80 | 2.5 | 505 | 638 | 789 | 957 |
| F | 30 | 70 | 20 | 80 | 2.25 | 373 | 633 | 728 | 832 |

*Percentage with respect to the total weight of the cementitious.

As it can be observed in FIG. 4, at 1 day the compressive strengths are increased in accordance with the percentage of additive is increased, except for the last proportion corresponding to 2.5% where its value diminishes.

With the obtained results, a maximum value of compressive strength was observed at 1 day for the proportion with 2.25% of additive being this value 565 Kg/cm²; in fact this mixture had the maximum values in all the test stages. Series F of FIG. 4 shows the compressive strengths values of the selected mixture when another reducing water additive is used (Glenium 106) in the same amount than Rheobuild-3000.

Example 9

Mixtures of PC, Milled Sand, Standard Sand and Reducing Water Additive

Figure 5:
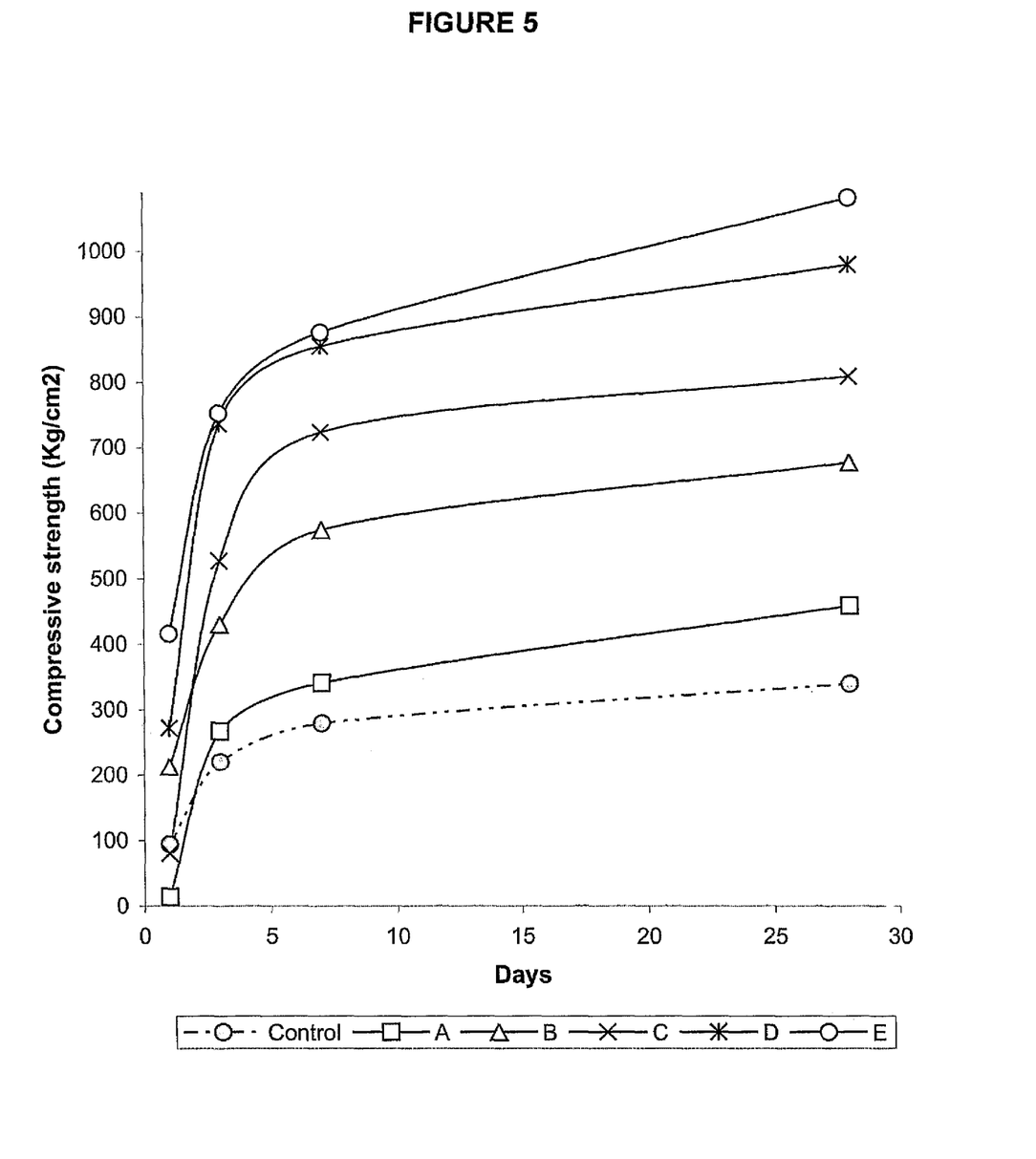
FIG. 5. Shows a graph of the values shown in the Table 6, that shows the compressive strength ($Kg/cm^2$) of test tubes elaborated with mixtures of PC, additive and variable percentage of milled sand and standard sand.

The mortar mixtures were obtained agreed to example 5, being used Rheobuild-3000 as reducing water agent. Table 6 and FIG. 5 show the compressive strengths reached in mixtures of variable proportions of milled sand, standard sand, PC, and with 2.25% of reducing water additive, based on cement weight, in comparison with a control mixture (without additive).

TABLE 6

| | % Cementitious | | % Sand | | %* Additive | Days of cured ($Kg^f/cm^2$) | | | |
|---|---|---|---|---|---|---|---|---|---|
| Series | MK | PC | Milled sand | Standard sand | | 1 | 3 | 7 | 28 |
| Control | 0 | 100 | 0 | 100 | 0 | 94 | 220 | 279 | 340 |
| A | 0 | 100 | 0 | 100 | 2.25 | 14 | 267 | 341 | 459 |
| B | 0 | 100 | 20 | 80 | 0 | 213 | 430 | 574 | 677 |
| C | 0 | 100 | 10 | 90 | 2.25 | 80 | 527 | 723 | 809 |
| D | 0 | 100 | 20 | 80 | 2.25 | 272 | 736 | 855 | 979 |
| E | 0 | 100 | 30 | 70 | 2.25 | 416 | 752 | 876 | 1081 |

*Percentage with respect to the total weight of the cementitious

FIG. 5 show the compressive strength values when a mortar with PC is prepared and a mixture of 20% of Milled Sand with 80% of standard sand is used, without using additive. The addition in that percentage of milled sand improves the fluidity of the mortar and decreases the relation w/c from 0.485 to 0.44. In addition, the milled sand increases the resistance of the PC in all dates of test showing a greater compressive strength value in comparison with the control, at the first day of 213 Kg/cm$^2$ and at 28 days of 677 Kg/cm$^2$.

For the case of the test tubes elaborated with pure PC and mixed with several percentage of milled sand and standard sand, it can be observed that a greater percentage of milled sand it is greater the compressive strength reached in all the stages of the test tubes. Thus, for mortar with 30% of milled sand the highest values are obtained; that is, 416 Kg/cm$^2$ at 1 day and 1081 Kg/cm$^2$ at 28 days (FIG. 5).

Example 10

Mixtures of Variable Amounts of MK, PC, Milled Sand, Standard Sand and Fixed Amounts of Reducing Water Additive The mortar mixtures were obtained agreed to example 5, being used Rheobuild-3000 as reducing water agent. Table 7 and FIG. 6 show the compressive strengths reached in mixtures of variable proportions of milled sand and standard sand, MK, PC, and with 2.25% of reducing water additive, based on the cement weight, in comparison with a control mixture (without additive).

Figure 6:
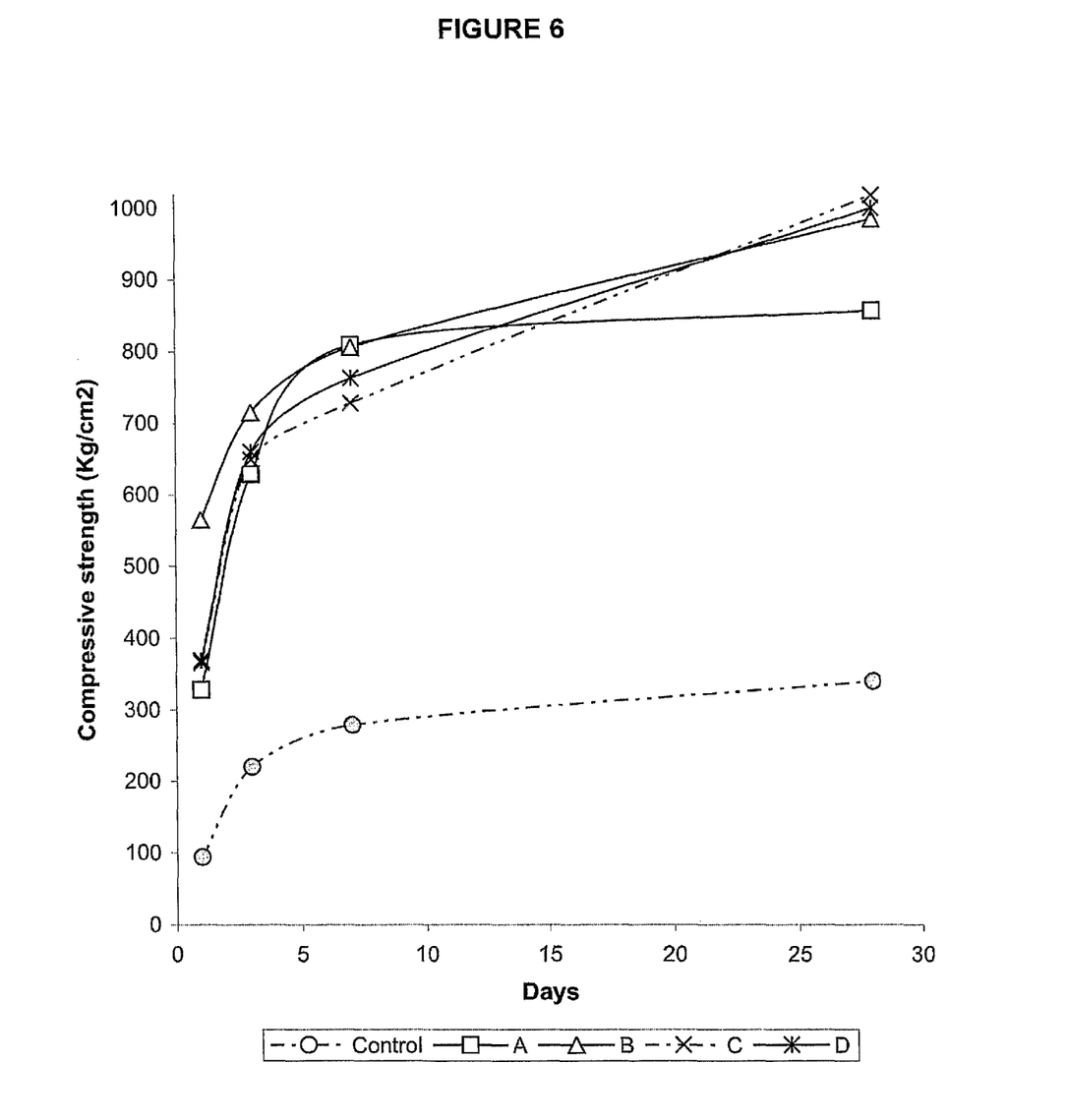
FIG. 6. Shows a graph of the values shown in the Table 7, that shows the compressive strength ($Kg/cm^2$) of test tubes elaborated with mixtures of 30% of ultra-fine clinker, 70% of PC, additive and variable percentage of milled sand and standard sand.

As it can be observed in FIG. 6, when comparing the samples with 10% of milled sand with and without MK, the most remarkable difference sees at first day since the mixture with MK developed 328 Kg/cm$^2$ whereas a mixture without it reached 80 Kg/cm$^2$ (FIG. 5 series C). To later stages, the difference is every small, but always above of which it contains MK that does not contain it.

The comparison between the compressive strengths values in mixtures with 20% of milled sand, with and without MK, allows to observe again the influence of the MK to increase the gain of compressive strengths values at 1 day, since the value for this combination reached 565 Kg/cm$^2$. The difference between the obtained compressive strengths values for these compositions to other stages is practically null. This composition in particular shows the maximum compressive strength value at 1 day, whereas for any other composition the compressive strengths values are below this one. Another interest data that appears for this composition is that the demand of water presents a minimum of 0.33 of w/c.

The composition with 30% of milled sand and 30% of MK, develops a smaller compressive strength at 1 day in relation to the composition with 20% of milled sand, nevertheless the reached one at 28 days (1018 Kg/cm$^2$) could be equivalent to this last one after practicing a statistical analysis. It is possible to confirm the mentioned above since the sample with 20% of milled sand has generated buckets with compressive strength values above 1000 Kg/cm$^2$, but the average of 985 Kg/cm$^2$ is the one that is shown.

For series D of FIG. 6 that corresponds to the mortar elaborated with 30% of MK and 40% of milled sand, significant changes with series C of FIG. 6 are not observed comparatively (30% of milled sand). The compressive strength development is equivalent in both cases. As it can be

TABLE 7

| | % Cementitious | | % Sand | | %* Additive | Days of cured ($Kg^f/cm^2$) | | | |
|---|---|---|---|---|---|---|---|---|---|
| Series | MK | PC | Milled sand | Standard sand | | 1 | 3 | 7 | 28 |
| Control | 0 | 100 | 0 | 100 | 0 | 94 | 220 | 279 | 340 |
| A | 30 | 70 | 10 | 90 | 2.25 | 328 | 629 | 809 | 857 |
| B | 30 | 70 | 20 | 80 | 2.25 | 565 | 715 | 806 | 985 |
| C | 30 | 70 | 30 | 70 | 2.25 | 366 | 649 | 728 | 1018 |
| D | 30 | 70 | 40 | 60 | 2.25 | 369 | 660 | 763 | 1000 |

*Percentage with respect to the total weight of the cementitious.

observed, for the compositions of example 9 and 10, the milled sand addition to the PC as to the PC-MK mixture, practically improves the compressive strength in all the stages.

REFERENCES

1. P. C. Hewlett. Lea's Chemistry of Cement and Concrete. Young Wiley & Sons. Inc., Fourth Ed. 1997.
2. L. Shondeep Sarkar and J. Wheeler. Important properties of an ultra fine cement—Part 1. *Cement and Concrete Research* 31 (2001) 119-123.
3. L. Shondeep Sarkar and J. Wheoler. Microstructural development of an ultra fine Cement—Part 1. *Cement and Concrete Research* 31 (2001) 125-128
4. Chartschenko, Igor. 1995. *Superfine cement binder mixture, process for its preparation and device for carrying out the process.* EP 0696558.
5. Karkare, Millind V. 1998. *Mortar admixtures and method of preparing same.* U.S. Pat. No. 5,736,600.
6. Karkare, Millind V. 2002. *Mortar admixtures and method of preparing same.* US 2002/0005149 A1.
7. Bonnel, Bernard. 1971. *Quick-setting cementitious compositions.* U.S. Pat. No. 3,591,542.
8. Yate, James. 1932. *Improvements in rendering building materials waterproof.* GB 368498.
9. Weinberg, Victor. 1944. *Improvements in the manufacture of porous light weight mortars and concrete and building insulating and other materials prepared therefrom.* GB 575439.
10. Ogden, J. Herbert. 1999. *Cement composition self-leveling floor coating formulations and their method of use.* U.S. Pat. No. 5,873,936.
11. De la Garza-Gutiérrez, H.2003. *Optimizing milling parameters for refining Portland cement.* Journal of Metastable and Nanocrystalline Materials. Vol. 15-16, pp. 395-400.

The invention claimed is:

1. A mortar composition, consisting of:
a) a cementitious material, selected from the group consisting of Portland cement, ultra-fine Portland cement, ultra-fine clinker or mixtures of such, wherein the particle size of the ultra-fine cementitious material is less than 10 μm to a particle size distribution of 100%,
b) sand, selected from the group consisting of silica sand within ASTM specifications for mortar, milled sand or mixtures thereof, wherein the particle size of the milled sand is to less than 10 μm with a particle size distribution of 95%, and
c) a polycarboxylate water reducing additive, wherein the cementitious material and the sand are in a proportion of 1:1 in weight with respect to the total weight of the mortar composition and the additive is additionally in a percentage in weight from 1 to 2.5 with respect to the weight of the cementitious material in the mortar composition.

2. The mortar composition of claim 1, wherein:
a) the cementitious material is a mixture of ultra-fine clinker in a proportion in weight with respect to the total weight of the cementitious material of no more than 70%, and Portland cement in a proportion in weight with respect to the total weight of the cementitious material from 30 to 100%,
b) the sand is a mixture of sand within ASTM specifications for mortar in a proportion in weight with respect to the total weight of sand from 60 to 100%, and milled sand in a proportion in weight with respect to the total weight of sand of no more than 40%, and
c) the water reducing additive is in a proportion in weight with respect to the total weight of the cementitious material in the mortar composition from 1 to 2.25%.

3. The mortar composition of claim 2, wherein:
a) the cementitious material is a mixture of ultra-fine clinker in a proportion in weight with respect to the total weight of the cementitious material of 30%, and Portland cement in a proportion in weight with respect to the total weight of the cementitious material of 70%,
b) the sand is a mixture of sand within ASTM specifications for mortar in a proportion in weight with respect to the total weight of sand from 60 to 90%, and milled sand in a proportion in weight with respect to the total weight of sand from 10 to 40%, and
c) the water reducing additive is in a proportion in weight with respect to the total weight of the cementitious material in the mortar composition of 2.25%.

4. The mortar composition of claim 1, wherein the cementitious material is Portland cement, the sand is within ASTM specifications for mortar and the water reducing additive is in a proportion in weight with respect to the total weight of the Portland cement in the mortar composition from 1 to 2.25%.

5. The mortar composition of claim 1, wherein the cementitious material is a mixture of ultra-fine clinker in a proportion in weight with respect to the total weight of the cementitious material from 10 to 50% and Portland cement in a proportion in weight with respect to the total weight of the cementitious material from 50 to 90%, the sand is within ASTM specifications for mortar, and the water reducing additive is in a proportion in weight with respect to the total weight of the cementitious material in the mortar composition of 2.25%.

6. The mortar composition of claim 3, wherein the sand is a mixture of sand within ASTM specifications for mortar in a proportion in weight with respect to the total weight of sand of 80% and milled sand in a proportion in weight with respect to the total weight of sand of 20%, and the water reducing additive is in a proportion in weight with respect to the total weight of the cementitious material in the mortar composition of 2.25%.

7. The mortar composition of claim 1, wherein the cementitious material is Portland cement, the sand is a mixture of sand within ASTM specifications for mortar in a proportion in weight with respect to the total weight of sand from 70 to 90% and milled sand in a proportion in weight with respect to the total weight of sand from 10 to 30%, and the water reducing additive is in a proportion in weight with respect to the total weight of the Portland cement in the mortar composition of 2.25%.

8. The mortar composition of claim 1 wherein it has a compressive strength from 10 MPa to 57 MPa at 1 day of setting and a compressive strength from 46 MPa to 108 MPa at 28 days of setting.

9. The mortar composition of claim 3, wherein it has a compressive strength of 33 MPa from 57 MPa at 1 day of setting and a compressive strength from 86 MPa to 102 MPa at 28 days of setting.

10. The mortar composition of claim 4, wherein it has a compressive strength of 46 MPa to 50 MPa at 28 days of setting.

11. The mortar composition of claim 5, wherein it has a compressive strength from 1.4 MPa to 32 MPa at 1 day of setting and a compressive strength from 46 MPa to 58 MPa at 28 days of setting.

12. The mortar composition of claim 6, wherein it has a compressive strength from 36 MPa to 57 MPa at 1 day of setting and a compressive strength from 80 MPa to 94 MPa at 28 days of setting.

13. The mortar composition of claim 7, wherein it has a compressive strength from 8 MPa to 42 MPa at 1 day of setting and a compressive strength from 81 MPa to 108 MPa at 28 days of setting.

14. A method for obtaining the mortar composition of claim 1, comprising:
   a) mixing a cementitious material selected from the group consisting of
      Portland cement, ultra-fine Portland cement, ultra-fine clinker or mixtures thereof, wherein the particle size of the ultra-fine cement material is less than 10 μm to a particle size distribution of 100%, with sand, selected from the group consisting of:
      silica sand within ASTM specifications for mortar, milled sand or mixtures thereof, wherein the particle size of milled sand is less than 10 μm to a particle size distribution of 95%, in a proportion 1:1 in weight with respect to the total weight of the mortar composition, and
   b) adding to the mixture obtained in a), a polycarboxylate water reducing additive in a percentage in weight from 1 to 2.5 with respect to the weight of the cementitious material in the mortar composition.

15. The method of claim 14, wherein the water reducing additive is added in a percentage in weight from 1 to 2.25 with respect to the weight of the cementitious material in the mortar composition.

16. The method of claim 15, wherein the mortar composition has a compressive strength from 10 MPa to 57 MPa at 1 day of setting and a compressive strength from 46 MPa to 108 MPa at 28 days of setting.

17. A method for manufacturing a mortar comprising combining an ultra-fine cementitious material and milled sand to produce a mortar with compressive strengths up to 108 MPa at 28 days of setting, wherein the ultra-fine cementitious material has a particle size less than 10 μm to a particle size distribution of 100%, and the milled sand has a particle size less than 10 μm to a particle size distribution of 95%.

18. A method to increase the compressive strength of mortar compositions consisting of cementitious material and sand, consisting of adding to the mortar composition a polycarboxylate water reducing additive, wherein said cementitious material is an ultra-fine cementitious material with a particle size less than 10 μm and a particle size distribution of 100% and/or said sand is milled sand which has a particle size less than 10 μm and a particle size distribution of 95%.

19. The method of claim 18, wherein the water reducing additive is added in a proportion in weight with respect to the total weight of the cementitious material from 1 to 2.5%.

20. The method of claim 19, wherein the additive is added in a proportion from 1 to 2.25%.

21. A method to increase the compressive strength of mortar compositions consisting of cementitious material and sand, consisting of:
   a) adding to the cementitious material, an ultra-fine cementitious selected from the group consisting of ultra-fine Portland cement, ultra-fine clinker or mixtures thereof, with a particle size less than 10 μm with a particle size distribution of 100%, and
   b) adding to the mortar composition, a polycarboxylate water reducing additive.

22. The method of claim 21, wherein the ultrafine cementitious is added in a proportion in weight with respect to the total weight of the cementitious material from 10 to 70%.

23. The method of claim 22, wherein the ultrafine cementitious is added in a proportion in weight with respect to the total weight of the cementitious material from 10 to 50%.

24. The method of claim 23, wherein the ultrafine cementitious is added in a proportion in weight with respect to the total weight of the cementitious material of 30%.

25. The method of claim 22, wherein the reducing water additive is added in a proportion in weight with respect to the total weight of the cementitious material from 1 to 2.5%.

26. The method of claim 25, wherein the water reducing additive is added in a proportion in weight with respect to the total weight of the cementitious material from 1 to 2.25%.

27. A method to increase the compressive strength of mortar compositions comprising cementitious material and sand, consisting of
   a) adding to the sand, milled sand with a particle size less than 10 μm Doll with a particle size distribution of 95%, and
   b) adding to the mortar composition, a polycarboxylate water reducing additive.

28. The method of claim 27, wherein the milled sand is added in a proportion in weight with respect to the total weight of sand from 10 to 40%.

29. The method of claim 28, wherein the milled sand is added in a proportion in weight with respect to the total weight of sand from 10 to 30%.

30. The method of claim 29, wherein the milled sand is added in a proportion in weight with respect to the total weight of sand of 20%.

31. The method of claim 28, wherein the water reducing additive is added in a proportion in weight with respect to the total weight of the cementitious material from 1 to 2.5%.

32. The method of claim 31, wherein the water reducing additive is added in a proportion in weight with respect to the total weight of the cementitious material from 1 to 2.25%.

33. A method to increase the compressive strength of mortar compositions comprising cementitious material and sand, consisting of:
   a) adding to the cementitious material, an ultra-fine cementitious selected from the group consisting of ultra-fine Portland cement, ultra-fine clinker or mixtures thereof, with a particle size less than 10 μm with a particle size distribution of 100%,
   b) adding to the sand, milled sand with a particle size less than 10 μm with a particle size distribution of 95%, and
   c) adding to the mortar composition, a polycarboxylate water reducing additive.

34. The method of claim 33, wherein the ultrafine cementitious is added in a proportion in weight with respect to the total weight of the cementitious material from 10 to 70% and the milled sand in a proportion in weight with respect to the total weight of sand from 10 to 40%.

35. The method of claim 34, wherein the ultrafine cementitious is added in a proportion in weight with respect to the total weight of the cementitious material from 10 to 50% and the milled sand in a proportion in weight with respect to the total weight of sand from 10 to 30%.

36. The method of claim 35, wherein the ultrafine cementitious is added in a proportion in weight with respect to the total weight of the cementitious material of 30% and the milled sand in a proportion in weight with respect to the total weight of sand of 20%.

37. The method of claim 34, wherein the water reducing additive is added in a proportion in weight with respect to the total weight of the cementitious material from 1 to 2.5%.

38. The method of claim 37, wherein the water reducing additive is added in a proportion in weight with respect to the total weight of the cementitious material from 1 to 2.25%.

39. A mortar composition, consisting of:
   a) a cementitious material, selected from the group consisting of Portland cement, ultra-fine Portland cement, ultra-fine clinker or mixtures of such, wherein the particle size of the ultra-fine cementitious material is less than 10 μm to a particle size distribution of 100%,
   b) sand, selected from the group consisting of silica sand within ASTM specifications for mortar, milled sand or mixtures thereof, wherein the particle size of the milled sand is less than 10 μm with a particle size distribution of 95%, and
   c) a polycarboxylate water reducing additive, wherein the cementitious material and the sand are in a proportion of 1:1 in weight with respect to the total weight of the mortar composition and the additive is additionally in a percentage in weight from 1 to 2.5 with respect to the weight of the cementitious material in the mortar composition, wherein when the cementitious material is only Portland cement, the sand is milled sand or a mixture of sand and milled sand.

40. A mortar composition, consisting of:
   d) a cementitious material, selected from the group consisting of Portland cement, ultra-fine Portland cement, ultra-fine clinker or mixtures of such, wherein the particle size of the ultra-fine cementitious material is less than 10 μm to a particle size distribution of 100%, and wherein when Portland cement is used it is used as part of a mixture,
   e) sand, selected from the group consisting of silica sand within ASTM specifications for mortar, milled sand or mixtures thereof, wherein the particle size of the milled sand is less than 10 μm with a particle size distribution of 95%, and
   f) a polycarboxylate water reducing additive, wherein the cementitious material and the sand are in a proportion of 1:1 in weight with respect to the total weight of the mortar composition and the additive is additionally in a percentage in weight from 1 to 2.5 with respect to the weight of the cementitious material in the mortar composition.

* * * * *